United States Patent [19]

Menahem et al.

[11] Patent Number: 5,182,961
[45] Date of Patent: Feb. 2, 1993

[54] THREE DEGREE OF FREEDOM TRANSLATIONAL AXIS HAND CONTROLLER MECHANISM

[75] Inventors: Israel Menahem, Clearwater; James Bacon, Largo, both of Fla.

[73] Assignee: Honeywell Inc., Minneapolis, Minn.

[21] Appl. No.: 738,255

[22] Filed: Jul. 30, 1991

[51] Int. Cl.$^5$ .................... G05G 9/04; B64C 13/04
[52] U.S. Cl. .................. 74/471 XY; 74/103; 74/491; 244/234
[58] Field of Search ............... 74/103, 471 XY, 491, 74/523; 244/234, 236

[56] References Cited

U.S. PATENT DOCUMENTS

| | | | |
|---|---|---|---|
| 1,282,853 | 10/1918 | Kelle | 74/103 |
| 2,198,635 | 4/1940 | Rossman | 74/103 |
| 3,484,004 | 12/1969 | Hughey | 74/103 X |
| 3,501,120 | 3/1970 | Daniel, Jr. | 74/103 |
| 3,771,037 | 11/1973 | Bailey, Jr. | 318/580 |
| 4,085,301 | 4/1978 | Smith | 200/4 |
| 4,132,318 | 1/1979 | Wang et al. | 214/1 |
| 4,150,803 | 4/1979 | Fernandez | 244/135 |
| 4,367,373 | 1/1983 | McDaniel et al. | 178/18 |
| 4,531,080 | 7/1985 | Nordstrom et al. | 318/628 |
| 4,555,960 | 12/1985 | King | 74/471 |
| 4,574,651 | 3/1986 | Nordstrom | 74/471 |
| 4,584,510 | 4/1986 | Hollow | 318/584 |
| 4,688,444 | 8/1987 | Nordstrom | 74/471 |
| 4,732,353 | 3/1988 | Studer | 244/165 |
| 4,756,655 | 7/1988 | Jameson | 414/2 |
| 4,895,039 | 1/1990 | Hegg | 74/471 |
| 4,901,948 | 2/1990 | Panos | 244/23 |
| 4,913,000 | 4/1990 | Wyllie | 74/523 |
| 4,914,976 | 4/1990 | Wyllie | 74/523 |
| 4,916,622 | 4/1990 | Raman et al. | 364/459 |
| 4,921,293 | 5/1990 | Ruoff et al. | 294/111 |

FOREIGN PATENT DOCUMENTS 210712  8/1960  Austria .................. 74/103

OTHER PUBLICATIONS

Theory of Machines and Mechanisms, "Straight-Line Mechanisms", pp. 22 and 23, Joseph Edward Shigley and John Uicker, Jr.
Kinematic Synthesis of Lingages, "Straight-Line Mechanism—Approximate and Exact", pp. 179-181.
U.S. Ser. No. 07/655,740 filed Feb. 14, 1991, Menahem et al.

Primary Examiner—Allan D. Herrmann
Attorney, Agent, or Firm—Donald J. Lenkszus; Charles J. Ungemach

[57] ABSTRACT

A hand controller which includes a hand grip having therein a mechanism for allowing truly linear motion along at least two axes by modifying a four-bar linkage with a second four-bar linkage to counteract any rotational motion that would otherwise occur.

18 Claims, 4 Drawing Sheets 5,182,961

THREE DEGREE OF FREEDOM TRANSLATIONAL AXIS HAND CONTROLLER MECHANISM

UNITED STATES GOVERNMENT RIGHTS

The invention described herein was made in the performance of work under NASA contract No. NAS 9-18200, and is subject to the provisions Section 305 of the National Aeronautics and Space Act of 1985, as amended (42 U.S.C. 2457).

BACKGROUND OF THE INVENTION

The present invention relates to controllers and more particularly to hand operated controllers for operating remote systems such as trains, robot arms, air or space craft, free fliers and the like.

In the prior art there are a number of hand controllers designed for controlling robots, aircraft or spacecraft, each having specific features useful for particular applications. For example, in the Israel Menahem patent application Ser. No. 07/655,740 filed Feb. 14, 1991 a unique mechanism is shown for purposes of providing a three degree of freedom hand grip in which all three axes intersect within the cavity of the grip to prevent cross-coupling. Force feedback is also provided from remotely located force producing devices through a unique connection therein described. One feature not found in the above co-pending application or in other such prior art references is a mechanism for truly allowing the hand grip to move with a linear motion along the for example, pitch or roll axes, i.e., those in a horizontal plane with respect to the craft or housing. Such truly linear motion is often desired to overcome cross-coupling which can occur between linear and rotational axis due to the arc motion of the linkage.

Although in a general sense straight line motion mechanisms are known in the art as, for example, the Roberts' mechanism to be later described herein, such mechanisms provide truly linear motion for only one point in the system. More particularly, if a Roberts' mechanism were used unaltered with a hand grip for controlling a craft, one point in the hand grip would move in a linear fashion as the hand grip is pushed, but such motion would be accompanied by rotational motion of other points in the hand grip. No mechanisms has heretofore been provided which will allow all of the points in a hand grip controller to move in a truly linear fashion, that is, with all the point moving parallel to a pre-determined direction.

SUMMARY OF THE INVENTION

The present invention provides a three degree of freedom hand grip controller in which the hand grip moves with truly linear motion. This is accomplished by utilizing a modified Roberts' mechanism to provide counter rotation of the hand grip in a direction which overcomes the rotation that occurs using a conventional Roberts' mechanism. The modification includes a second linkage mechanism connecting a portion of the Roberts' mechanism to the hand grip so that as the rotational movement of the Roberts' mechanism occurs counter rotational movement is produced on the hand grip by the additional linkage.

DETAILED DESCRIPTION OF THE PREFERRED EMBODIMENTS

Figure 1:
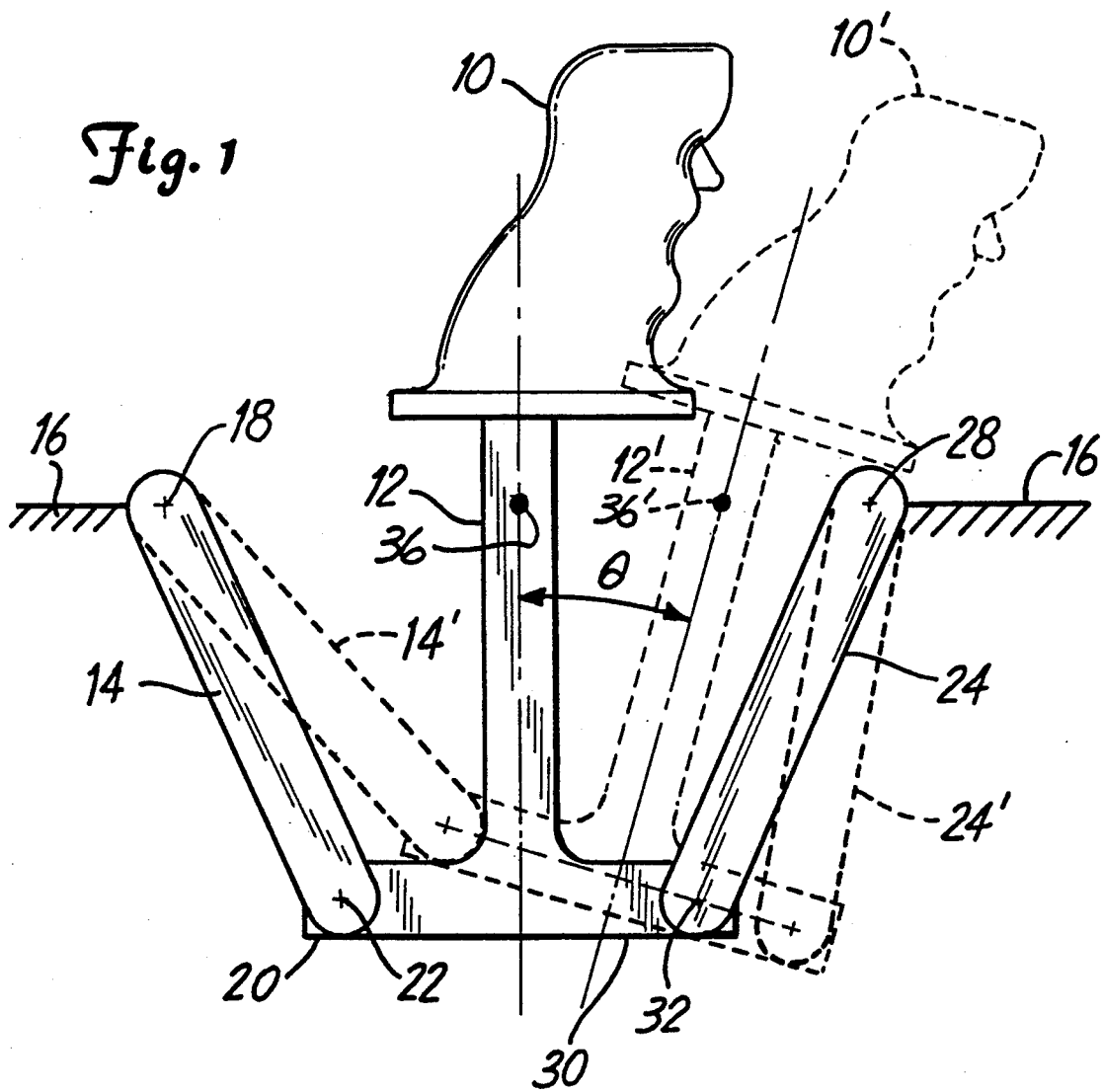
FIG. 1 shows a hand grip connected to a mechanism similar to a form of Roberts' mechanism.

In FIG. 1 a typical hand grip 10 is shown connected to a member 12 which appears in the form of a inverted "T".

A bar 14 is shown pivotally connected to a base 16 at a point 18 and extends downwards to the right to be pivotally connected to the left end extension 20 of T-shaped member 12 at a point 22.

A second bar 24 is shown pivotally connected to the base 16 at a point 28 and extends downwards to the left where it is connected to the right hand extension 30 of T-shaped member 12 at a point 32.

The T-shaped member 12, bar 14 and bar 24 connected together with the base 16 form a four-bar linkage which is similar to the Roberts' mechanism as is described a book entitled "Theory of Machines and Mechanisms" by Joseph Shigley and John Uicker, Jr., published by McGraw-Hill Book Company, Section 1-11 entitled "Straight Line Mechanisms" on pages 22 and 23 describe four such mechanisms the (b) one of which is a Roberts' mechanism. Also see a book entitled "Kinematic Synthesis" by Richard Hartenberg and Jacquest Denauit, published by McGraw-Hill Book Company, Section 6-6 entitled "Straight Line Mechanisms-Approximate and Exact", pages 179–181.

As is known from the Roberts' mechanism principal a point 36 which lies half way along a line between points 18 and 28 will move in a straight line as the mechanism is moved to the right and left as in FIG. 1. To show this, FIG. 1 also includes a dashed line version of the elements so far described with reference numerals the same as those used with respect to the solid line version except that they are primed. It is seen as the grip 10 moves to the right to accept a new position 10', bar 14 rotates counter clockwise around pivot 18 to a new position 14', similarly bar 24 will rotate counter clockwise around pivot 28 to a new position 24'. This motion is accompanied by a clockwise rotation of the inverted "T" member 12 to a new position 12'. It is seen that while point 36 has now moved linearly along the line between points 18 and 28 to a new point 36', the hand grip 10 has rotated with the T-shaped member 12 by an angle shown as "Θ" in FIG. 1. Such motion could cause undesirable cross-coupling in the mechanism with which the hand controller is employed.

Figure 2:
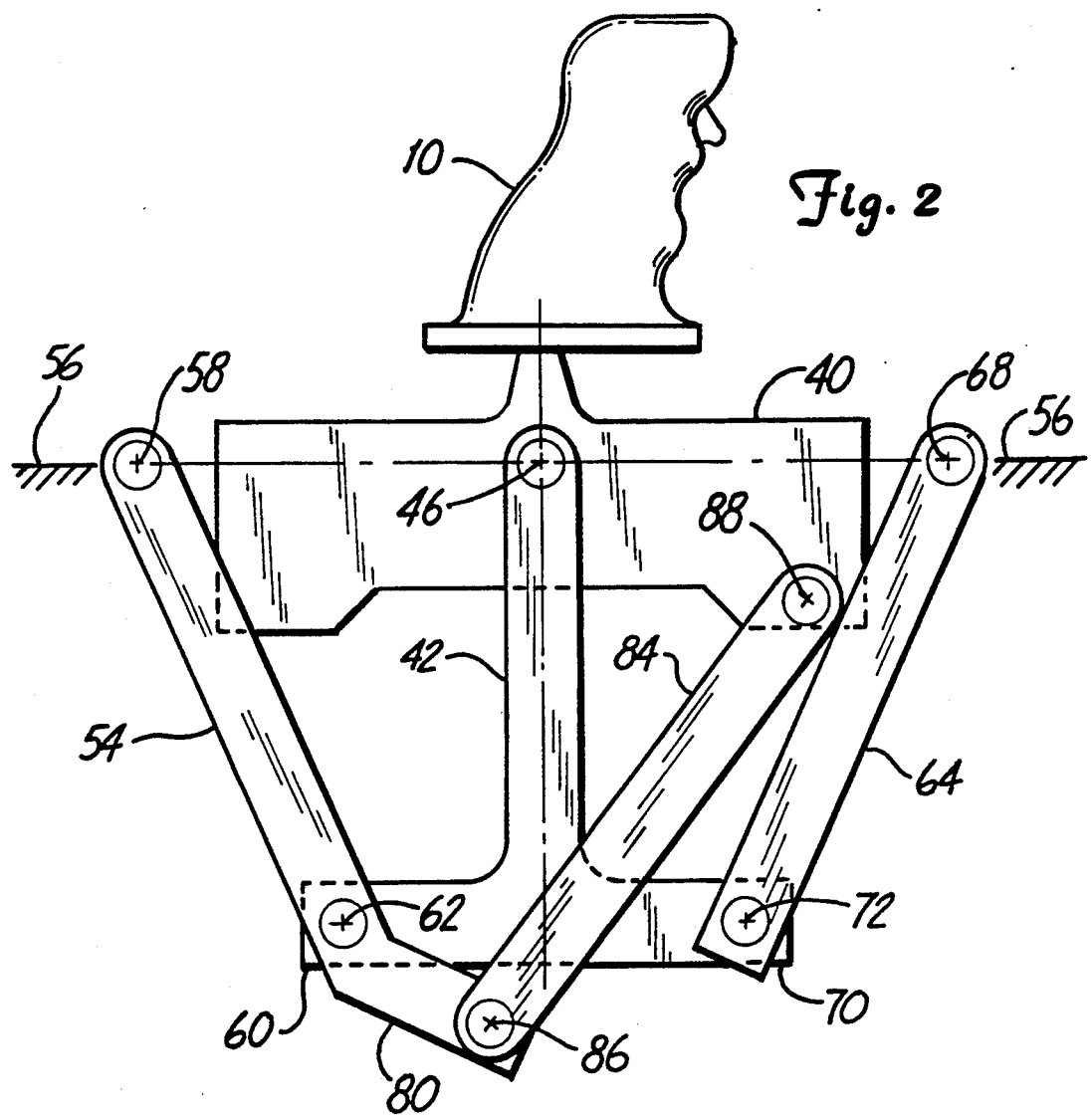
FIG. 2 shows the modification to the hand grip of FIG. 1 as employed in one form of the present invention.

Referring now to FIG. 2, the hand grip 10 is now shown connected to a block shaped member 40 which is pivoted to an inverted T-shaped member 42 at a point 46. In other words the hand grip 10 is no longer fixedly mounted to the inverted T-shaped member 42, but is, instead, pivotally connected thereto.

A first bar 54 is pivotally mounted to a base 56 at a point 58 and extends downwardly to the right where it is pivotally connected to the left hand extension 60 of inverted T-shaped member 42 at a point 62. Similarly, a second bar 64 is pivotally connected to the base 56 at a point 68 and extends downwardly to the left where it is pivotally connected to the right hand extension 70 of inverted T-shaped member 42 at a point 72. The base 56, inverted T-shaped member 42 and bars 54 and 64 form a first four bar linkage which is quite similar to the Roberts' mechanism above-described in FIG. 1, except that the hand grip 10 is no longer fixedly connected to T-shape member 42.

In the embodiment of FIG. 2, bar 54 is shown with an extension 80 extending downward to the left beyond the point 62 and third bar 84 is shown pivotally connected to the end of extension 80 at a point 86 and extends upwardly to the right while its other end 15 pivotally connected to the block shaped member 40 at a point 88 lies below and to the right of point 46. A second four-bar linkage is thereby formed by the inverted "T" 42, the extension 80, the bar 84 and the block member 40 which operates as will be hereandafter described in connection with FIG. 3, to provide truly linear movement of hand grip 10. More particularly, as hand grip 10 is moved to the right, point 46 continues to move in a straight line along the line between points 58 and 68 as was in the case of FIG. 1, but now, instead of this motion being accompanied by rotational motion of the hand grip 10, such motion will produce counter rotational forces through the linkage 80 and 84 to cause block member 40 to rotate in a counter clockwise direction with the result that all points of grip 10 will move in lines parallel to the line between points 58 and 68 as is desired.

Figure 3:
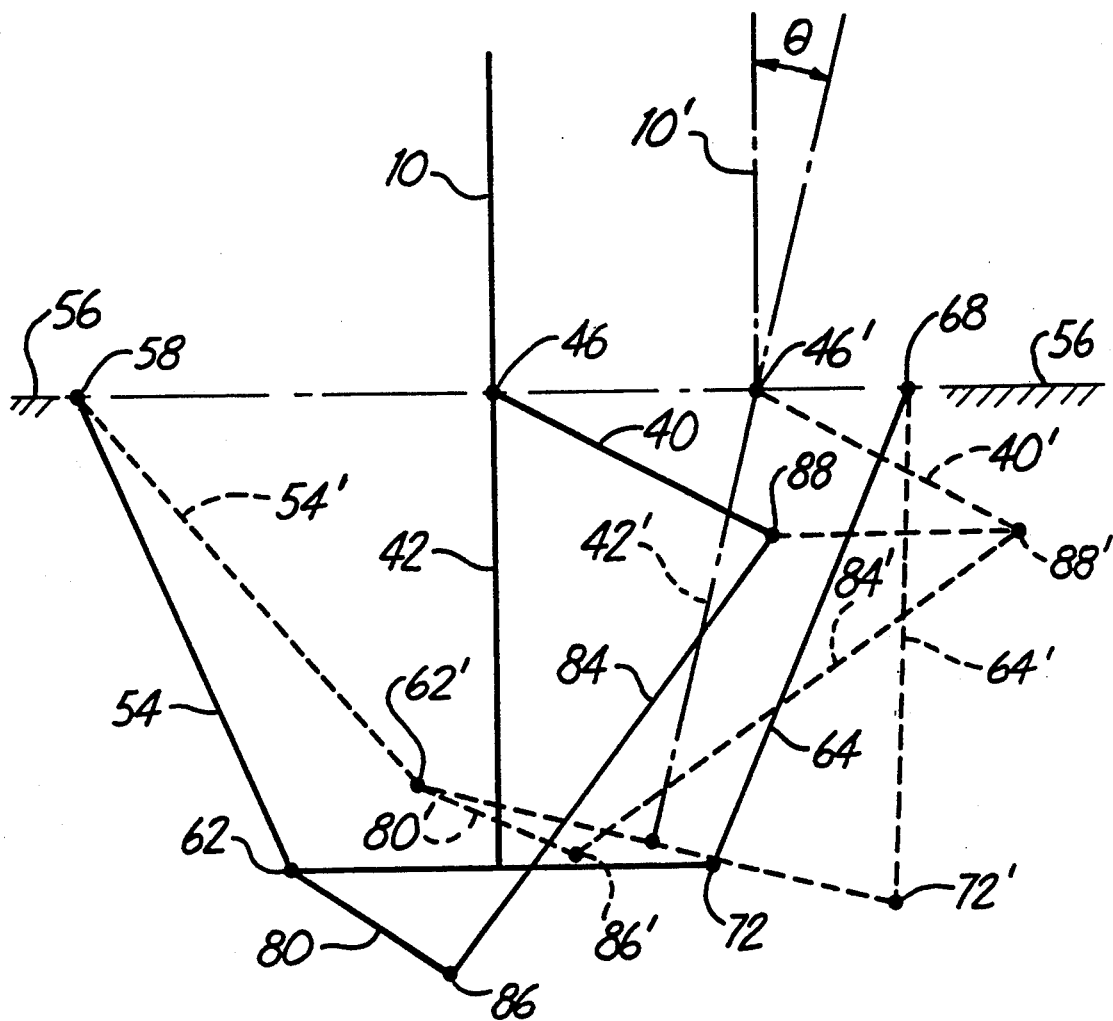
FIG. 3 shows a geometric layout for describing the movement of the handgrip of FIG. 2 in one direction.

Refer now to FIG. 3 wherein the bars and blocks of FIG. 2 are shown as straight lines for clarity. The points 46, 58, 62, 68, 72, 86 and 88 represent the pivotal connection shown in FIG. 2 and accordingly have been given the same reference numerals as used in FIG. 2. Likewise, the straight lines joining the points in FIG. 3 have been given the reference numerals used in connection with the various mechanisms of FIG. 2. For example, the hand grip is shown as a straight line 10 fixedly connected to a straight line 40. The inverted "T" 42 is shown pivotally connected at points 62 and 72 to bar members 54 and 64 of which are pivotally connected to the base member 56 at points 58 and 68.

FIG. 3 also shows the apparatus in a second position by dash lines which carry the same reference numerals as the solid lines but are primed. It is seen that the hand grip 10 is moved to the right in FIG. 3, bar 54 rotates counterclockwise about point 58 to a new position 54' while bar 64 rotates in a counterclockwise direction about point 68 to a new position 64'. Accompanying this motion, the T-shaped member 42 rotates in a clockwise direction to a new position 42'. All of this is as it was in FIG. 1 and would produce a rotational motion Θ of grip 10 if it were not for the present invention.

Accompanying rotation of member 54 about point 58 extension 80 moves to a new position 80' and in doing so pushes bar 84 against point 88 of member 40 so that bar member 90 is forced to move in a counter clockwise direction to a new position 40'. By popularly choosing the lengths of extension 80, bar 84 and the arm represented by block 40, the amount of counter clockwise rotation of block 40 can be made equal to angle Θ so that point 88 remains the same distance from the line between points 58 and 68 as it was originally. With both points 46 and 84 moving linearly, it can be seen that all points of block 40 and grip 10 move in lines parallel to the line between points 58 and 68 as is desired. Thus, the desire truly linear motion of grip 10 has been accomplished.

As an example of the length of the various elements capable of producing the desired linear motion, the following values have been found satisfactory:

| Distance Between Points | Inches |
| --- | --- |
| 58 and 68 | 5.00 |
| 58 and 46 | 2.50 |
| 46 and 88 | 1.92 |
| 58 and 62 | 3.00 |
| 62 and 86 | 1.00 |
| 86 and 88 | 3.13 |
| 62 and 72 | 2.50 |
| 72 and 68 | 3.00 |
| 88 and line joining 58 and 68 | 0.80 |

It should be understood that the above values represent only one specific embodiment of the present invention and that the arrangements and values can be created using the principles herein described.

Figure 4:
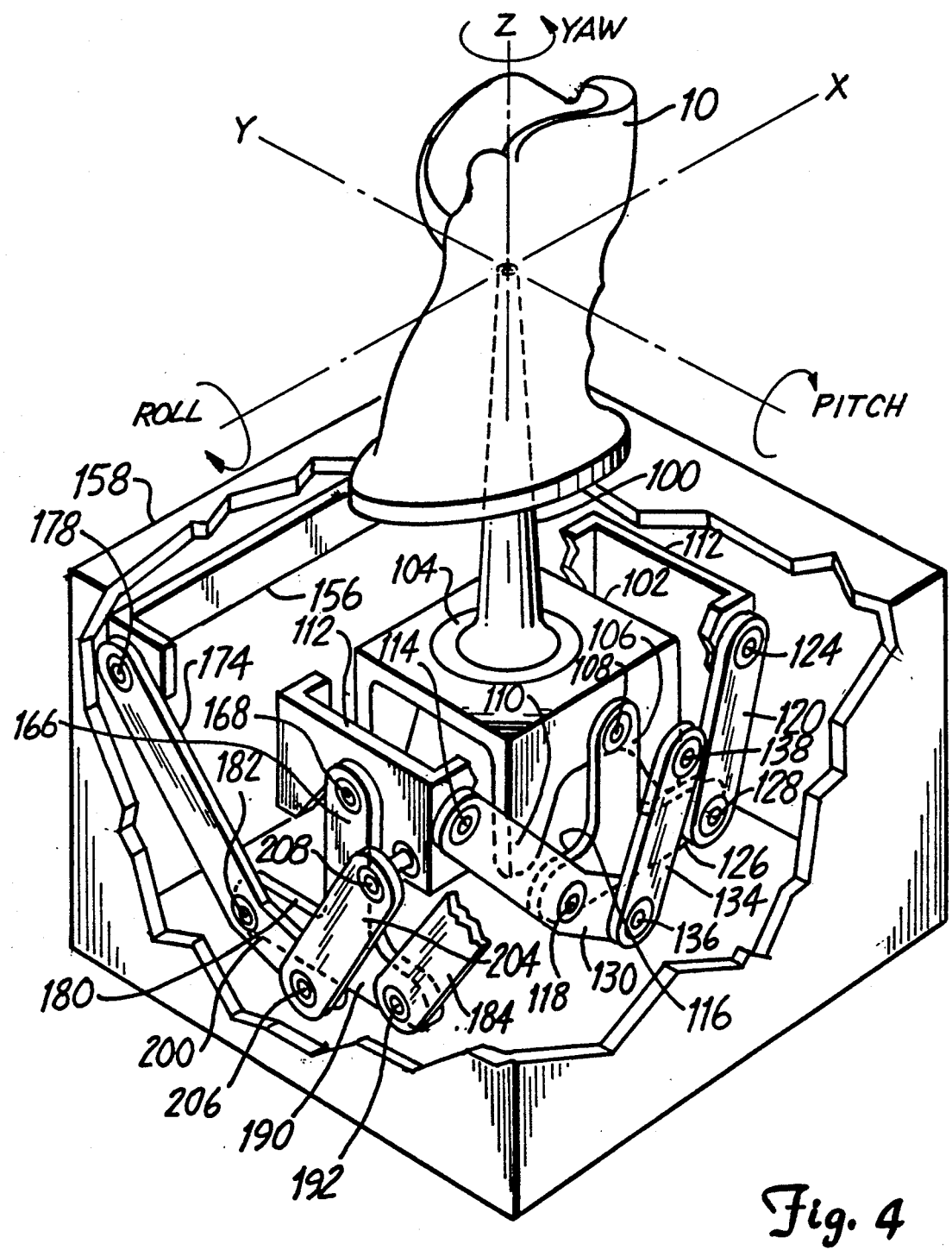
FIG. 4 is a perspective and partially exploded view of a hand grip mounted to provide linear motion in both of the pitch and roll axes.

It is now seen that the Roberts' mechanism modified as I have described above produces a hand grip motion which is truly linear. The description above has been shown in connection with one axis, the roll axis, for example. In order to accomplish linear motion along a second or roll axis as may be desired for a hand controller used in aircraft control type mechanisms, it is only necessary that the base or frame 56 shown in FIG. 3 itself mounted in additional modified Roberts' mechanism to a second base or frame. For example, one possible way of mounting such arrangement is shown in FIG. 4. In FIG. 4 the hand grip 10 is shown mounted for motion about 3 mutually orthaganol axes X, Y and Z which represent pitch, roll and yaw. Pushing grip 10 along the direction X will produce an output for the pitch axis while pushing the hand grip 10 along the direction Y will produce a roll output and turning grip 10 about the Z direction will produce an output for the yaw axis. The mechanisms for producing output signals for use by the aircraft are not shown in FIG. 4 but may be like those described in the above-copending application of Israel Menahem Serial No. 07/655,740.

Grip 10 is shown connected to a shaft 100 which is mounted for pivotal motion in a block 102 by a bearing 104. A first inverted T-shaped member 106 is pivotally connected to block 102 at a pivot 108. A first bar 110 is connected to a first frame member 112 at a pivot 114 and extends downwardly to be connected to a left extension 116 of inverted T-shape member 106 at a pivot 118. A second bar 120 is pivotally connected to frame 112 at a pivot 124 and extends downwardly to the left where it is connected to the right hand extension 126 of inverted T-shape member 106 at a pivot 128. Bar 110 has an extension 130 which is connected to a third bar 134 at a pivot 136 and bar 134 extends upwardly to the right where it is pivotally connected to block 102 at a pivot 138. The apparatus described this far in FIG. 4 is substantially equivalent to the apparatus shown in FIG. 2 and allows for motion of grip 10 along the X direction in a truly linear fashion as described above. While not shown, similar apparatus to the inverted "T" 106, bars 110, 120, 130 and 134 may be connected to the other side of block 102 for symmetry and to prevent unbalance.

The frame member 112 may also be mounted for truly linear motion along the Y direction by being connected in a similar fashion to a second frame 156 mounted in a housing 158 which has been shown in cut-away view to expose the apparatus. A second inverted "T" member 166 is shown connected to frame member 112 at a pivot 168. A first bar member 174 is pivotally connected to the frame 156 at a pivot 178 and extends downwardly to the right and is pivotally connected to the left end extension 180 of inverted "T" member 168 at a pivot 182.

A second bar 184 is also pivotally connected to frame 156 connected to box 158 at a point which is not shown in FIG. 4 for clarity but which will be understood to be similar to the connections heretofore described. Bar 184 extends downwardly to the left where it is pivotally connected to the right hand extension 190 of inverted "T" member 166 at a pivot 192.

Member 174 has an extension 200 which is pivotally connected to a bar 204 at a pivot 206. Bar 204 extends upwardly to the right where it is pivotally connected to frame 112 at a pivot 208. While not shown, the linkage mechanism including inverted T-shaped member 166, bars 174, 184, extension 200 and bar 204 may also be connected to the other side of the frame member 112 to provide for symmetry and to prevent unbalance.

In any event, it is seen that the frame 112 will now move in the Y direction with truly linear motion in the same manner as has been described with connection to block 102.

It is therefore seen that I have provided a hand grip which can move in the X and Y direction with truly linear motion without rotation which could cause possible cross-coupling problems. While I have shown the yaw axis as being rotational about the Z axis which is common and quite without any cross-coupling problems, it is seen that I could further provide for truly linear motion up and down in FIG. 4 by including a third modified Roberts' mechanism to allow box 158 to move in yet another frame of reference up and down.

It is seen that I have provided a desired three degree of freedom translational axis hand controller mechanism which will move in truly linear fashion as was not obtainable with the prior art mechanism and have done so with a simple straight forward mechanical linkage mechanism.

Many changes will occur to those skilled in the art and the specific mechanisms described in connection with a preferred embodiments may be modified so as to provide other arrangements for producing truly linear motion by utilizing the principals herein described. Accordingly, although the invention has been described with reference to the preferred embodiments, workers skilled in the art will recognize that changes may be made in form and detail without departing from the spirit and scope of the invention.

What is claimed is:

1. Apparatus for moving a first member having first and second points thereon, in a first direction with respect to a base member so that the first and second points move, with respect to the base member, only parallel to the first direction comprising:
   first linkage means connected to the base member and to the first member and operable to permit the first point to move, with respect to the base member, only parallel to the first direction, and;
   second linkage means connected to the first linkage means and to the first member and operable to rotate the first member, when the first member moves with respect to the base member, by an amount sufficient to cause the second point to also move, with respect to the base member, only parallel to the first direction.

2. Apparatus according to claim 1 wherein the first linkage means and base member comprise a four-bar linkage.

3. Apparatus according to claim 2 wherein the four-bar linkage substantially comprises a Roberts' mechanism.

4. Apparatus according to claim 1 wherein the first linkage includes a first structure having third fourth and fifth points thereon and wherein the first point is pivotally connected to the third point.

5. Apparatus according to claim 4 wherein the first linkage further includes a second structure with sixth and seventh points thereon, the sixth point being pivotally connected to the base member and the seventh point being pivotally connected to the fourth point.

6. Apparatus according to claim 5 wherein the first linkage further includes a third structure with eighth, ninth and tenth points thereon, the eighth point being pivotally connected to the base member, the ninth point being pivotally connected to the fifth point and the tenth point being pivotally connected to the second linkage means.

7. Apparatus according to claim 6 wherein the second linkage means has eleventh and twelfth points thereon, the eleventh point being pivotally connected to the tenth point and the twelfth point being pivotally connected to the second point.

8. Apparatus according to claim 7 wherein the first, sixth and eighth points are in a line along the first direction.

9. Apparatus according to claim 8 wherein the sixth and eighth points lie the same distance on either side of the first point.

10. Apparatus for moving a first member having first and second points thereon, in first and second directions with respect to a base member so that the first and second points move, with respect to the base member, only in planes parallel to the plane of the first and second directions comprising:
    first linkage means connected to the first member and to an intermediate member and operable to permit the first point to move, with respect to the intermediate member, only in a plane parallel to the first direction;
    second linkage means connected to the first linkage means and to the first member and operable to rotate the first member, when the first member moves with respect to the intermediate member, by an amount sufficient to cause the second point to also move, with respect to the intermediate member, only in a plane parallel to the first direction;
    third linkage means connected to the intermediate member and to the base member and operable to permit the third point to move, with respect to the base member, only in a plane parallel to the second direction; and
    forth linkage means connected to the third linkage means and to the intermediate member and operable to rotate the intermediate member, when the intermediate member moves with respect to the base member, by an amount sufficient to cause the forth point to also move, with respect to the base member, only in a plane parallel to the second direction.

11. Apparatus according to claim 10 wherein the first linkage means and intermediate member comprise a first four-bar linkage and the third linkage means and base member comprise a second four-bar linkage.

12. Apparatus according to claim 11 wherein the first and second four-bar linkage each substantially comprise a Roberts' mechanism.

13. Apparatus according to claim 10 further including means mounting the first member for rotational motion about a third axis.

14. In apparatus for use with a Roberts' mechanism which includes a first member having first, second and third points thereon arranged in a triangle, a second member pivotally connected to the first member at the first point and to a frame member at a fourth point and a third member pivotally connected to the first member at the second point and to the frame member at a fifth point, so that the third point is movable within the mechanism only along a line between the fourth and fifth point, the improvement comprising:
- a fourth member pivotally connected to the first member at the third point and having a sixth point thereon, and
- a fifth member pivotally connected to the fourth member at the sixth point and to the second member at a seventh point so that as the fourth member moves, the sixth point moves parallel to the movement of the third point.

15. Apparatus according to claim 14 further including a sixth member having eighth, ninth and tenth points thereon arranged in a triangle, a seventh member pivotally connected to sixth member at the eighth point and to a base member at an eleventh point, an eighth member pivotally connected to the sixth member at the ninth point and to the base member at a twelfth point so that the tenth point is movable within the mechanism only along a line between the eleventh and twelfth points and further including means pivotally connecting the frame member to the sixth member at the tenth point, and a ninth member pivotally connected to the seventh member at a thirteenth point and to the frame member at a fourteenth point so that as the frame member moves, the fourteenth point moves parallel to the movement of the tenth point.

16. Apparatus according to claim 15 wherein the fourth member is a hand grip for a controller mechanism.

17. Apparatus according to claim 16 wherein the hand grip is also rotatable about an axis perpendicular to the plane of the motions of the third, sixth, tenth and fourteenth points.

18. The method of making all points of a first member move in parallel straight lines comprising the steps of:
- pivotally connecting a first point on the first member to the point of a Roberts' mechanism which moves in a straight line; and
- pivotally connecting a second member to the first member at a second point thereon and to a point of the Roberts' mechanism which does not move in straight line so as to produce counter rotational movement of the first member by an amount substantially equal to the rotation of the first member that would be caused by the Roberts' mechanism.

* * * * *